United States Patent [19]

Date

[11] Patent Number: 5,054,175
[45] Date of Patent: Oct. 8, 1991

[54] MACHINE TOOL HAVING AUTOMATIC CHANGEABLE TABLES

[75] Inventor: Takao Date, Shizuoka, Japan

[73] Assignee: Toshiba Kakai Kabushiki Kaisha, Tokyo, Japan

[21] Appl. No.: 544,105

[22] Filed: Jun. 22, 1990

[30] Foreign Application Priority Data

Jun. 23, 1989 [JP] Japan .................................. 1-162370

[51] Int. Cl.⁵ ...................... B23Q 41/02; B65G 47/00
[52] U.S. Cl. ..................................... 29/33 B; 29/563; 198/346.1
[58] Field of Search .......................... 29/33 P, 563, 564; 198/346.1, 345.3, 803.13, 465.2; 414/744.3, 744.4

[56] References Cited

U.S. PATENT DOCUMENTS

| | | | |
|---|---|---|---|
| 3,099,873 | 8/1963 | Brainard et al. | 198/346.1 X |
| 4,482,043 | 11/1984 | Bauman et al. | 29/33 P |
| 4,494,282 | 1/1985 | Ida et al. | 29/33 P |
| 4,715,490 | 12/1987 | Date et al. | 198/346.1 |

FOREIGN PATENT DOCUMENTS

| | | | |
|---|---|---|---|
| 635054 | 2/1978 | Fed. Rep. of Germany | 29/33 P |
| 84276 | 7/1978 | Japan | 29/33 P |
| 134161 | 10/1981 | Japan | 29/33 P |
| 57-173938 | 11/1982 | Japan | 29/33 P |
| 61-13937 | 4/1986 | Japan | 29/33 P |
| 865417 | 4/1961 | United Kingdom | 29/33 P |

Primary Examiner—William Briggs
Attorney, Agent, or Firm—Cushman, Darby & Cushman

[57] ABSTRACT

A machine tool with automatic changeable tables that has an immobile bed unit. Mounted on the bed unit are linear guides. Multiple table units move along the linear guides for mounting and dismounting workpieces. The table units are placed on the linear guides and into position by a transferring drive unit. The present invention allows workpieces to be mounted and dismounted at a remote area while machining is in process.

26 Claims, 6 Drawing Sheets

MACHINE TOOL HAVING AUTOMATIC CHANGEABLE TABLES

BACKGROUND OF THE INVENTION

1. Field of the Invention

This invention relates to a machine tool, such as a machining center, a plano-milling machine, or the like, in which a table is moved along a linear-way. More specifically this invention relates to a machine tool in which the table itself is changed to mount and dismount a workpiece on the table.

2. Description of the Related Art

In the related art, a machine tool having a method of setting a pallet table on a pallet base is used, in which the pallet table is essentially to a table top. In such a machine, a workpiece is mounted on the pallet table outside the machine, and thereafter the pallet table is set into the machine tool to reduce the downtime of the machine tool needed for workpiece changing.

In such a machine tool, there is a reduction in the rigidity of the machine, as compared to one in which the workpiece is mounted directly on an integral table, because of the existence of separation and combination forces at the pallet table/pallet base interface. This results in a reduction of the machinability and has an adverse effect on the machining accuracy.

Further, the height of the machine is increased, because the pallet table is mounted on the pallet base. Because of this increase in height, the height of the column having the tool is also increased. Thus there is also a reduction in the rigidity of the machine. This also results in a reduction of the machinability and has an adverse effect on the machining accuracy.

Furthermore, the total weight of the pallet table and the pallet base is increased, as compared to that of a single table, so that deformation of the bed is also increased. This requires an increase in the driving power and also results in adverse effects on the machining accuracy. If these adverse effects are to be avoided, a limitation of the load is required. This also results in a reduction in the machinability or the machining specifications because of possible relative motion between the pallet table and pallet base.

In another known method for changing a workpiece of a machine tool, such as a machining center, a plurality of tables are prepared.

In this case, a workpiece is mounted and machined on one table. During the machining process for the workpiece, another workpiece is mounted on or dismounted from another table. In such case, because the workpiece is mounted on and dismounted from the other table during the machining process for another workpiece, the mechanical accuracy is influenced. Also it is difficult to increase the number of tables because a machining center is designed for only a specific number of tables and lacks flexibility for adding more.

By contrast, in a machine tool having pallet tables, it is much easier to increase the number of pallet tables. Accordingly it is desired to provide a machine tool having changeable tables, such as pallet tables, which are low in height and relatively free of adverse effects to machining accuracy.

SUMMARY OF THE INVENTION

It is an object of the present invention to provide a machine tool in which the entire work table is changed in order to mount and dismount a workpiece.

According to a preferred embodiment of this invention, there is provided a machine tool for machining a workpiece, the machine tool has integral linear guides and is installed on a foundation. A bed means is provided for installing the machine tool on the foundation. The bed means is immobile with respect to the rest of the machine tool and has linear guides fixed thereto. A removable table means is provided upon which the workpiece is mounted. The table means is attached to the bed means by the linear guides. A transferring drive means for moving the table means along the linear guides is also provided.

Further objects, features, and advantages of the invention will become more apparent from the following description and the appended claims with reference to the accompanying drawings, all of which form a part of this specification.

DETAILED DESCRIPTION OF THE PREFERRED EMBODIMENT

A Preferred embodiment of the present invention will be now described in more detail with reference to the accompanying drawings.

Figure 1:
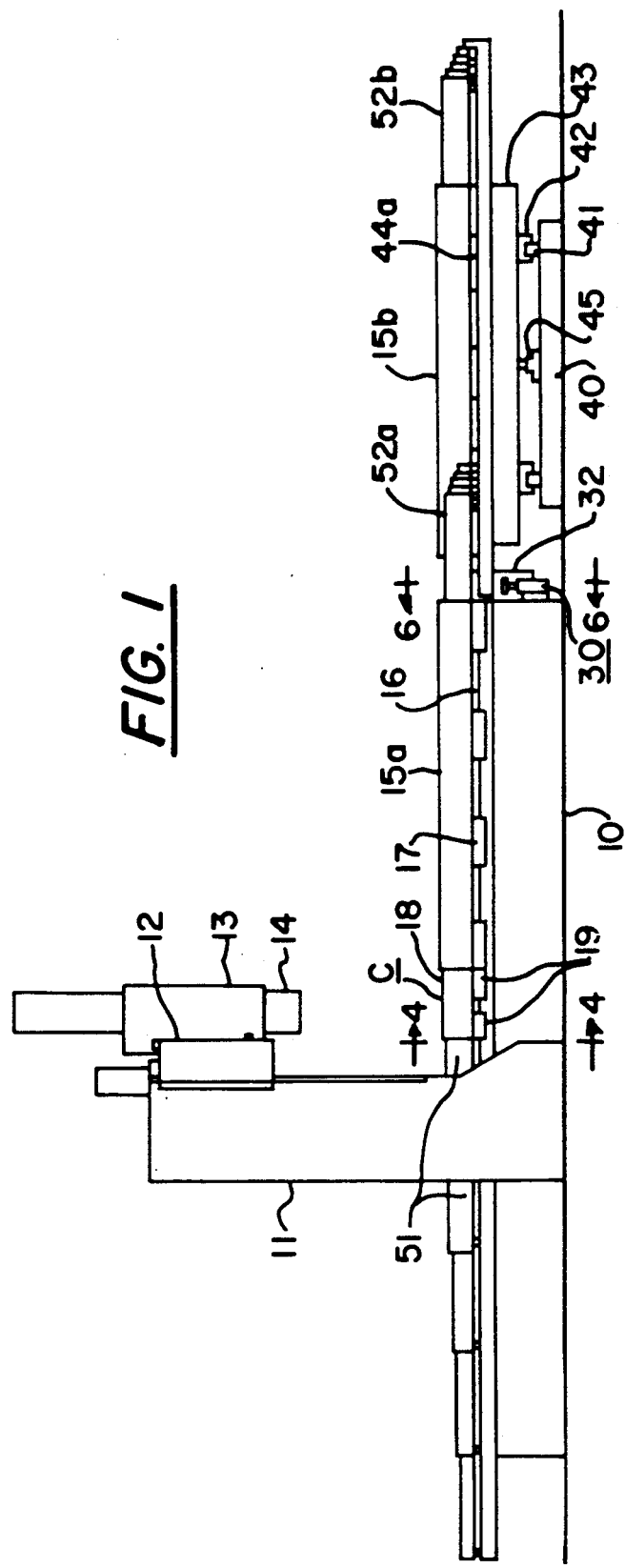
FIG. 1 is a general side view of the preferred embodiment of the present invention.
Figure 2:
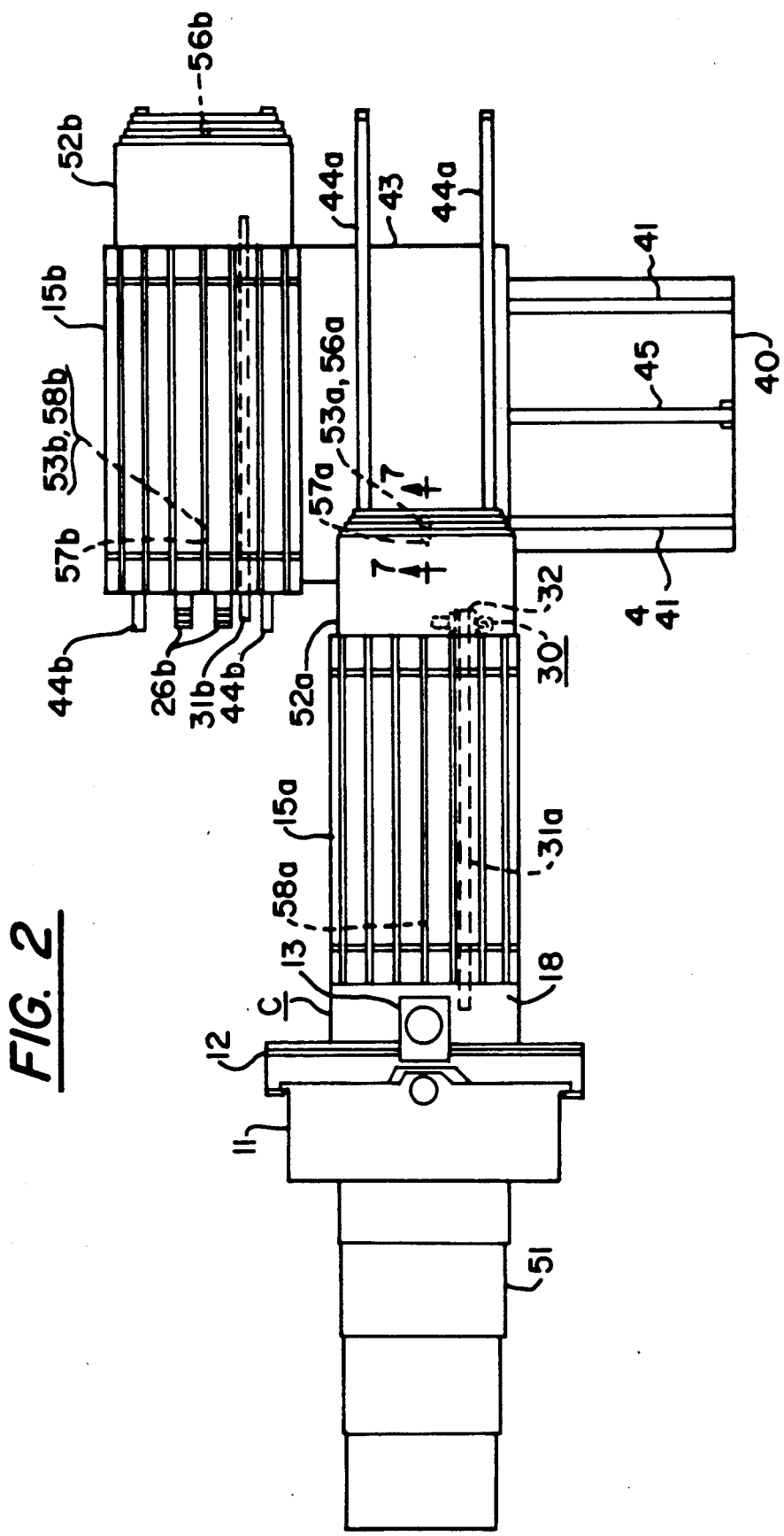
FIG. 2 illustrates a plan view of the embodiment shown in FIG. 1.
Figure 3:
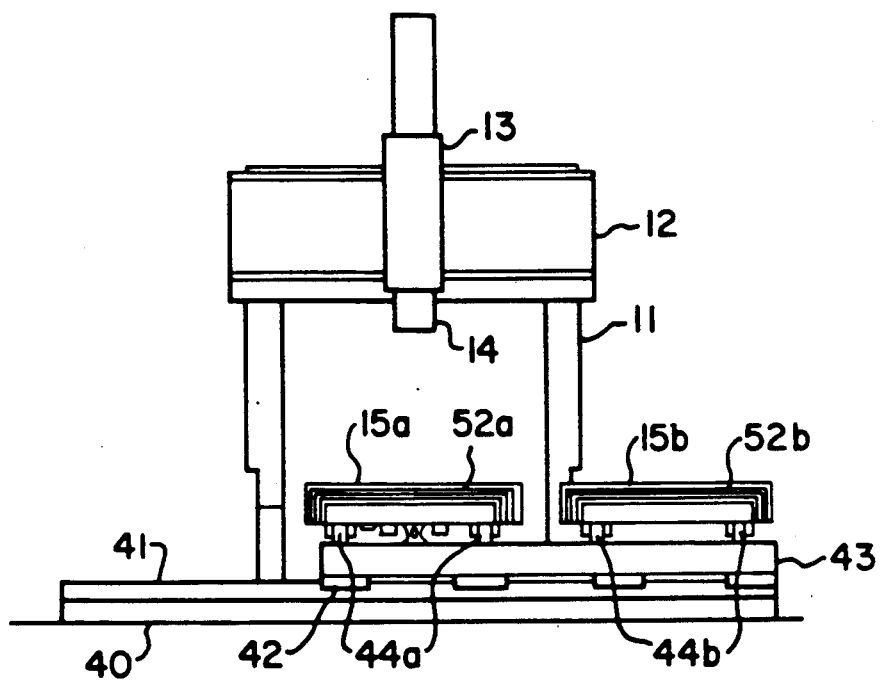
FIG. 3 is a right, front view of the embodiment shown in FIG. 1.

The structure of the machine tool is illustrated in FIGS. 1-3, in which the machine comprises bed 10, column 11, cross-rail 13, and ram 14. These elements work the same as in a conventional type of plano-milling machine.

In the figures, table 15a is movably mounted on two linear-ways 16 via table bearing unit 17. Nut-carrier 18 is one of the elements which constitute a connection means, and is connected to the back side (the left side in FIG. 1) of table 15. Nut-carrier 18 is mounted movably on linear-ways 16 via carrier bearing unit 19, and is independent of table 15a.

Figure 4:
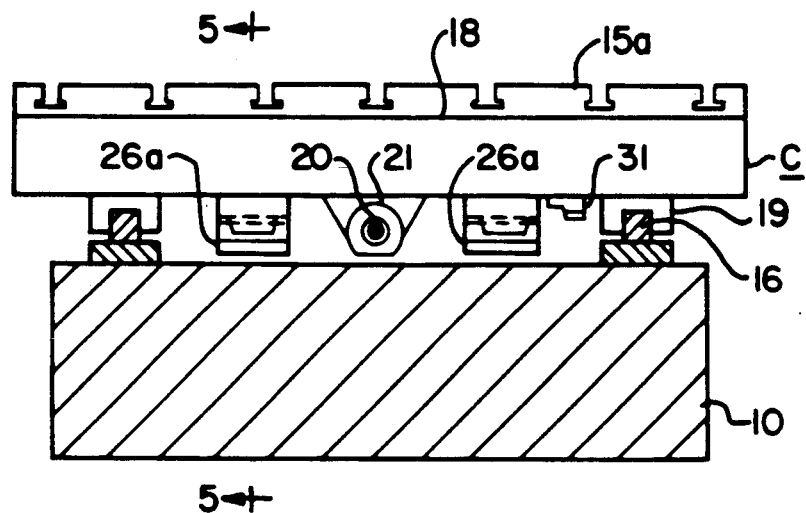
FIG. 4 illustrates an expanded sectional view taken along the line 4—4 of FIG. 1.

As shown in FIG. 4, feed screw 20 is attached to bed 10 between linear-ways 16 and is parallel to linear ways 16. Feed screw 20 is rotated by a motor (electric or hydraulic) which is not shown, and it operates similarly to a conventional type of machine. Nut 21 is fixed to nut-carrier 18, and engaged with feed screw 20.

Figure 5:
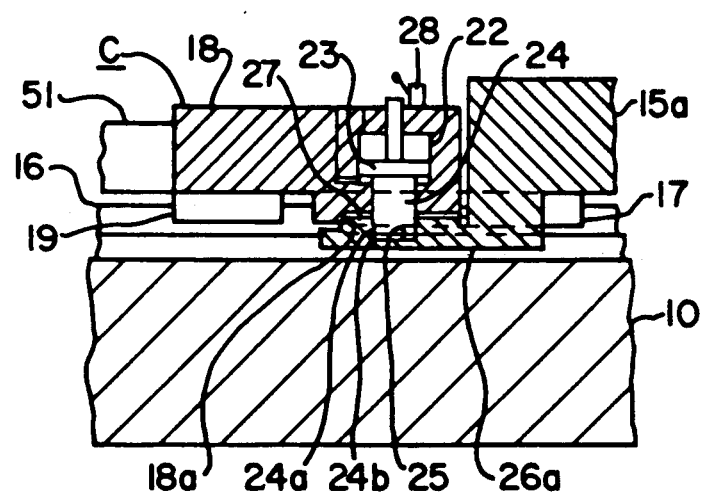
FIG. 5 illustrates partial sectional view taken along the line 5—5 of FIG. 4.

As shown in FIG. 5, cylinder 22 is attached to nut-carrier 18, and piston 23 is located therein. Locating pin 24 is provided in a cavity at the bottom end of piston 23.

On the other hand, connecting block 26a, having concave area 25, is provided at the back end of table 15a. Connecting block 26a has sloped face 24a and projection 27. Slope face 24b is formed at the left bottom of locating pin 24 in FIG. 5, and projection 27 is between slope plane 24a and vertical plane 18a which is provided on nut carrier 18 in the opposite side.

When locating pin 24 is in the connecting position as shown in FIG. 5, connecting block 26a is connected to fix the relative position between nut carrier 18 and table 15a in the right and left direction (table feed direction in FIG. 5).

When locating pin 24 is raised and comes out of concave area 25, connecting block 26a is disconnected and allows table 15a to move freely away from nut carrier 18 in the right direction (forward direction).

Detector 28 is provided to provide visual indication of the rising of locating pin 24. The connection means, which consists of locating pin 24 and connecting block 26a, is also provided on the opposite side of feed screw 20 in a mirror image form, as shown in FIG. 4.

As shown in FIG. 2, rack 31a is attached to the bottom plane of the table 15a in parallel with linear-ways 16. Rack 31a extends the same amount at the front end and the back end of table 15a. Pinion drive unit 32 is attached to the front end of bed 10, together with rack 31a, and constitutes transferring drive unit 30.

Figure 6:
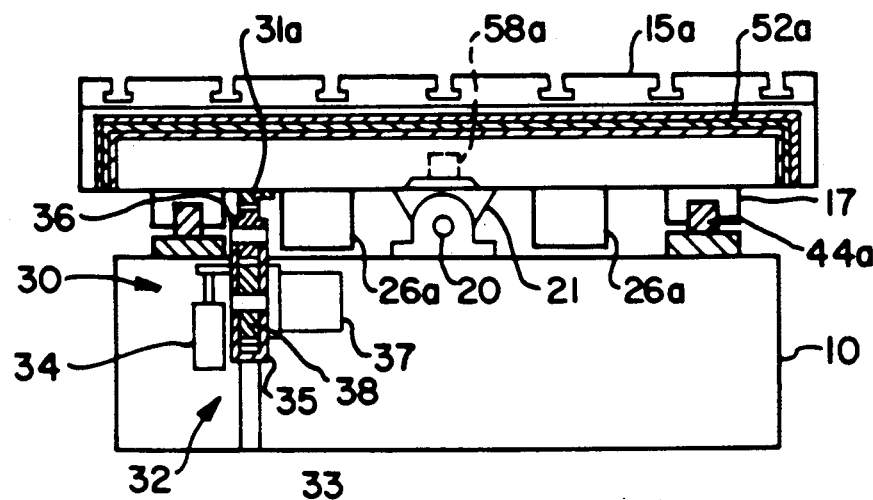
FIG. 6 illustrates an expanded sectional view taken along the line 6—6 of FIG. 1.

As shown FIG. 6, pinion drive unit 32 is attached movably to guide 33 which runs vertically. Guide 33 is attached to the front end of the bed 10. Further, pinion drive unit 32 has gear box 35 which is moved upward and downward by cylinder 34. Pinion 36 is geared into rack 31a and is rotatably attached to the top of gear box 35. Pinion 36 is given forward and reverse rotation from motor 37 by gear 38 which lies therebetween.

As shown in FIGS. 1 through 3, table changing bed 40 is set at the front end of bed 10, and two cross linear-ways 41 are attached thereon perpendicular to linear-ways 16. Table changing base 43 is set on cross linear-ways 41 by changing base bearing unit 42 which lies therebetween. Two pairs of sub linear-ways 44a, 44b are attached parallel to each other on table changing base 43, and in line with linear-ways 16.

The two pairs of the sub linear-ways 44a, and 44b, alternately become an extension of linear-ways 16 when table changing base 43 is moved right or left (up or down in FIG. 2). The counter ends of the linear-ways 16 and sub linear-ways 44a, 44b are near each other, when placed in line, with a small gap therebetween.

As shown in FIGS. 1 and 2, the front end of rear protection cover 51 which covers linear-ways 16 is connected to the back end of nut carrier 18. The back end of protection cover 51 is connected in a stationary manner to the other end of linear-ways 16 (far left in FIG. 1).

The front end of front protection cover 52a is connected to the front end of table 15a. The other end of front protection cover 52a is movable on sub linear-ways 44a and, as shown FIGS. 2 and 7, may be engaged with stopper 53a which is attached to table changing base 43.

Figure 7:
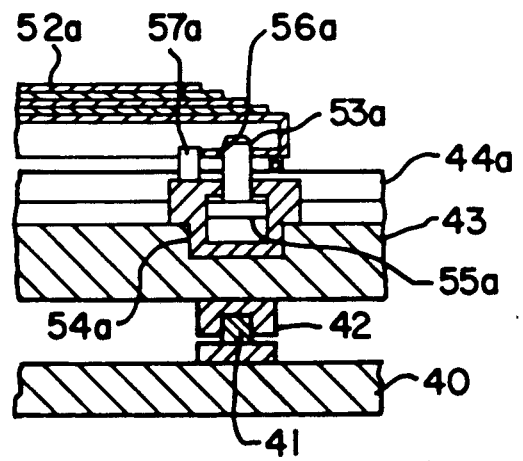
FIG. 7 illustrates a partial expanded sectional view taken along the line 7—7 of FIG. 2.
Figure 8:
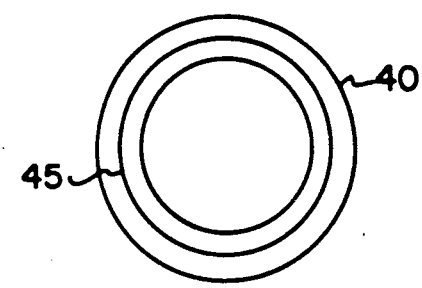
FIG. 8 is a top view of the table changing bed when it is of the circuitous type.

As shown in FIG. 7, the stopper 53a is moved up and down by piston 55a of cylinder 54a which is attached on table changing base 43, and is capable of inserting and removing stopper 53a from stopping hole 56a. Auxiliary stopper 57a limits the left end position for protection cover 52a, and is also shown in FIG. 7.

When table 15a is transferred on sub linear-ways 44a and is exchanged with another table 15b, as shown in FIG. 2, it is possible for stopper 53a to be inserted in stopping hole 58a which is set under table 15a. Stopper 53a acts to keep table 15a at the assigned position on sub linear-ways 44a.

Further the same type of stopper, stopper 53b and an auxiliary stopper 57b are prepared between sub linear-ways 44b. Another table 15b and another front protection cover 52b are constructed similar to table 15a and front protection cover 52a.

The method of the operation of the machine tool mentioned above will be explained below.

An unshown workpiece is mounted and machined on table 15a. At this time table 15a is connected to nut-carrier 18 by location pin 24 and moved on bed 10 along linear-ways 16. The machining process is then operated in a manner similar to a normal machining process of a conventional machine tool.

The front end of front protection cover 52a is engaged with stopper 53a which is set on table changing base 43. Front protection cover 52a expands and contracts with the movement of table 15a, and covers the upper portion of linear-ways 16.

During the machining process pinion drive unit 32 is driven downward by cylinder 34, and pinion 36 and rack 31a are not engaged. Meanwhile, another workpiece on table 15b which has already been machined is dismounted, and a workpiece to be machined is mounted on table 15b.

After the machining process using table 15a, as shown in the FIGURES 1 and 2, table 15a is moved to the front end of bed 10. In this status the front end of rack 31a is positioned above pinion 36. Then, as shown in FIG. 6, gear box 35 is moved upward and pinion 36 is engaged with rack 31a.

Thereafter location pin 24 which is shown in FIG. 5, is moved upward, and nut-carrier 18 and table 15a are disconnected from each other. After stopper 53a is driven downward and the front end of front protection cover 52a is made movable, pinion 36 is driven by motor 37 and table 15a is transferred onto sub linear-ways 44a using the rack 31a. At this time nut carrier 18 is held by bearing unit 19, and kept in that position.

When table 15a is transferred completely onto sub linear-ways 44a, stopper 53a is driven upward and inserted into stopping hole 58a which is set in the bottom surface of table 15a.

Then table 15a is fixed on table changing base 43 and gear box 35 is driven downward. This terminates the transferring motion of table 15a which is transferred from bed 10 to table changing base 43.

Table changing base 43 is then moved downward in FIG. 2 by base drive unit 45, which includes a hydraulic cylinder, and the position of the sub linear-ways 44b shown in the upper part of the FIG. 2 coincides with an extended position of the linear-ways 16.

The back end of rack 31b attached on the under surface of the table 15a is located above pinion 36. Gear box 35 is moved upward, and rack 31 is engaged with pinion 36. After stopper 31 is moved downward, motor 37 drives table 15b to transfer on linear-ways 16.

When the back end of table 15b approaches nut carrier 18, the movement of table 15b is stopped. Locating pin 24 is then moved downward, and nut carrier 18 and the table 15b are connected to each other. Further, gear box 35 is moved downward, and rack 31b and the pinion 36 are disengaged.

Then feed screw 20 is rotated, and table 15b is moved to the stroke-end on the back side of bed 10. This motion of table 15b causes the front protection cover 52b, which was piled and shortened, to be pull out and expanded. Then the front end of protection cover 52b touches the auxiliary stopper 57b, as shown in FIG. 7. When the front end of protection cover 52b is restricted from moving, the position of the front protection cover 2b is settled. Then stopper 53b is driven upward and inserted into the stopping hole 56b. This completes the termination of the transfer of table 15b and thereafter machining using table 15b may be performed.

The above described preferred embodiment is an example of the present invention applied to a planomilling machine. However, the present invention is not restricted to only this type of machine tool. The present invention can be widely applied to several types of machine tools, in which a table move along linear-ways, such as in a machining center, in a boring machine, or the like.

Also in the preferred embodiment described above, an example in which a machine tool has two pairs of sub linear-ways 44a and 44b is described, and these sub linear-ways are set in parallel on table changing base 43, and the tables are moved in a direction across linear-ways 16. Thus two pairs of sub linear-ways 44a and 44b, table changing base 43, one table and other elements constitute a transferring station in the embodiment.

A plurality of tables and a plurality of the sub linear-ways may be also provided in the transferring station. In such a case it is possible to change a plurality of tables in sequence or at random.

Figure 9:
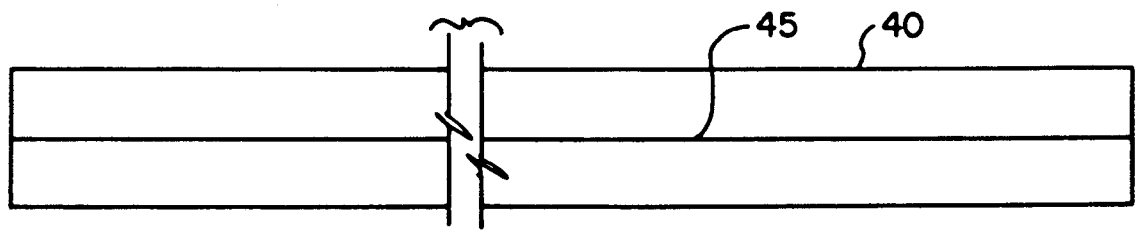
FIG. 9 is a top view of the table changing bed when it is of the endless rail type.

Also several types of table changing units may be used, such as a circuitous type of sub linear-ways, (see FIG. 9), an endless rail type, (see FIG. 9) and the like.

Further in this preferred embodiment, feed screw 20 and nut carrier 18 which move independently with table 15a are used for the table driving unit and these are connected to table 15a, so that connection and disconnection of table 15a and table driving unit can be achieved exactly. The table driving unit is not restricted to this type of feed screw 20, but also may be one of several types of table driving units, such as a combination of a rack and pinion or the like.

Still further in this embodiment, protective covers 52a and 52b are provided for protection of linear-ways 44a, 44b. One end of the protection cover is connected to nut carrier 18 which is attached to the end of table and the opposite side of protective cover is connected to another end of the table. Further the top of the cover is held and released on the table changing base. These constructions enable the tables of the machine tool to be changed without obstruction from the protective covers. Furthermore, a rack and pinion is provided in the transferring unit. Thus the table transferring motion can be achieved simply, exactly, and rapidly.

However, the transferring drive unit is not restricted to only a combination of a rack and pinion. An intermittent feeding method may be used, such as a combination of a hydraulic cylinder and a piston or the like.

Also, in this embodiment, the hydraulic cylinder constitutes the base driving unit, while other means may also be used, such as a rack and pinion or a motor (electric or hydraulic) or the like.

As described above, according to the present invention, a working rate equal to that of machine tools using pallet tables can be achieved. Also, the workpiece can be mounted directly on the table, not on the pallet table, and the construction of the machine tool can be simplified. This does not cause a reduction in the rigidity of the machine tool nor a reduction in the machining accuracy and in the machinability.

Accordingly this invention results in a machine tool capable of high machining accuracy and a high machinability.

What is claimed is:

1. A changeable table apparatus for a machine tool mounted on a foundation for machining a work piece, comprising:
    an immobile bed fixedly attached to said foundation;
    at least one linear guide fixedly attached to said bed;
    a removable table upon which a workpiece is mounted, said table being slidably attached to said linear guide;
    transferring drive means for moving said table along said linear guide;
    first protective cover means, attached to said bed, for covering at least a first portion of said linear guide; and
    connection means for connecting said table to said first protective cover means, said connection means including a nut carrier, said nut carrier being engaged with a feed screw of the machine tool.

2. A changeable table apparatus as described in claim 1, further comprising;
    a second protective cover means, movable with said table, for covering at least a portion of said linear guide.

3. A changeable table apparatus for a machine tool on a foundation, comprising:
    an immobile bed fixedly attached to said foundation;
    at least one linear guide fixedly attached to said bed;
    a first removable table upon which a first workpiece is mounted, said first table being slidably attached to said linear guide;
    a second removable table upon which a second workpiece is mounted;
    transferring drive means for moving said first and second tables along said linear guide;
    protective cover means, selectably movable with said first and second table, for covering at least a portion of said linear guide; and
    transferring station means for receiving and storing said first and second tables, comprising:
        a table changing bed attached to the machine tool,
        at least one cross linear guide attached to said table changing bed, said cross linear guide extending essentially perpendicular to said linear guide,
        a table changing base slidably mounted on said cross linear guide and having a stopper for fixing one end of said protective cover means to said table changing bed,
        at least one sub-linear guide fixedly attached to said table changing bed and extending essentially parallel to said linear guide, and
        a base driving unit for driving said table changing base to a table changing position wherein said sub-linear guide is placed in line with said linear guide.

4. A changeable table apparatus as described in claim 1, wherein said first protective cover means includes an expandable cover with a first end and a second end, said first end being attached to said nut carrier and said second end being attached to a portion of said linear guide.

5. A changeable table apparatus as described in claim 1, wherein said table includes a table surface and a plurality of bearing units attached thereto for slidable engagement with said linear guides.

6. A changeable table apparatus as described in claim 5, wherein said transferring drive means comprises:
a rack unit connected to said table;
a pinion drive unit attached to said bed; and
motor means for driving said pinion drive unit.

7. A changeable table apparatus as described in claim 6, wherein said pinion drive unit comprises:
a pinion;
a gear rotated by said motor means;
and engagement means for engaging and disengaging said pinion and said rack unit.

8. A changeable table apparatus as described in claim 6, wherein said motor means is an electric motor.

9. A machine tool as described in claim 6, wherein said motor means is a hydraulic motor.

10. A changeable table apparatus as described in claim 2, wherein said second protective cover means is connected to said table.

11. A changeable table apparatus as described in claim 1, further comprising: second table similar to said table; and transferring station means for receiving and storing said table and said second table.

12. A changeable table apparatus as described in claim 11, wherein said transfer station means includes:
a table changing bed attached to said machine tool;
at least one cross linear guide attached to said table changing bed, said cross linear guide extending perpendicular to said linear guide;
a table changing base slidably mounted on said cross linear guide;
at least one sub linear guide fixedly attached to said table changing base and running parallel to said linear guide; and
a base driving unit for driving the table changing base to a table changing position wherein said sub linear guide is placed in line with said linear guide.

13. A changeable table apparatus as described in claim 12, wherein said base driving unit includes a hydraulic cylinder.

14. A changeable table apparatus as described in claim 12, wherein said base driving unit includes a rack, a pinion and a motor.

15. A changeable table apparatus as described in claim 14, wherein said motor is an electric motor.

16. A changeable table apparatus as described in claim 14, wherein said motor is a hydraulic motor.

17. A changeable table apparatus as described in claim 12, wherein said table changing base includes a stopper for fixing one end of said second protective cover means with respect to said table changing base.

18. A changeable table apparatus as described in claim 11, further comprising means for causing said base drive unit to sequentially select said table and said second table for installing and removing said workpiece.

19. A changeable table apparatus as described in claim 11, further comprising means for causing said base drive unit to randomly select said table and said second table for installing and removing workpiece.

20. A changeable table apparatus as described in claim 11, wherein said transfer station means is of a circuitous type.

21. A changeable table apparatus as described in claim 11, wherein said transfer station means is of an endless rail type.

22. A changeable table apparatus as described in claim 1, wherein said machine tool is of a plano-milling type.

23. A changeable table apparatus as described in claim 1, wherein said machine tool is a machining center.

24. A changeable table apparatus as described in claim 1, wherein said machine tool is a boring machine.

25. A changeable table apparatus as described in claim 3, further comprising:
control means for causing said base driving unit to sequentially select said first and said second table to be driven to said table changing position.

26. A changeable table apparatus as described in claim 3, further comprising:
control means for causing said base driving unit to randomly select said first table and said second table to be driven to said table changing position.

* * * * *